(12) United States Patent
Loyd et al.

(10) Patent No.: US 6,612,260 B1
(45) Date of Patent: Sep. 2, 2003

(54) FLEX-AIR VENTILATED RACK SYSTEM

(75) Inventors: Eddie L. Loyd, Siloam Springs, AK (US); Jason D. Owens, Siloam Springs, AK (US)

(73) Assignee: Alternative Design Manufacturing & Supply, Inc., Siloam Springs, AK (US)

( * ) Notice: Subject to any disclaimer, the term of this patent is extended or adjusted under 35 U.S.C. 154(b) by 0 days.

(21) Appl. No.: 10/274,750

(22) Filed: Oct. 21, 2002

(51) Int. Cl.⁷ .................................................. A01K 1/03
(52) U.S. Cl. ........................................ 119/418; 119/419
(58) Field of Search ................................ 119/417, 418, 119/419, 455, 457

(56) References Cited

U.S. PATENT DOCUMENTS

| | | | |
|---|---|---|---|
| 4,480,587 A | 11/1984 | Sedlaceki | |
| 4,593,650 A | 6/1986 | Lattuada | |
| 5,000,120 A | 3/1991 | Coiro, Sr. et al. | |
| 5,048,459 A | * 9/1991 | Niki et al. | 119/418 |
| 5,148,766 A | 9/1992 | Coiro, Sr. et al. | |
| 5,307,757 A | 5/1994 | Coiro, Sr. et al. | |
| 5,954,013 A | 9/1999 | Gabriel et al. | |
| 6,138,610 A | * 10/2000 | Niki | 119/418 |
| 6,158,387 A | 12/2000 | Gabriel et al. | |
| 6,308,660 B1 | 10/2001 | Coiro, Sr. et al. | |
| 6,457,437 B1 | * 10/2002 | Frasier et al. | 119/419 |
| 6,571,738 B2 | * 6/2003 | Rivard | 119/419 |

* cited by examiner

Primary Examiner—Charles T. Jordan
Assistant Examiner—Elizabeth Shaw
(74) Attorney, Agent, or Firm—Christine J. Daugherty; Wright, Lindsey & Jennings LLP (57) ABSTRACT

The present invention is an animal cage adapted for providing supply air to the cage by either static or forced ventilation, comprising, a cage receptacle and ventilation distribution means integral to said cage receptacle for distributing supply air to an interior space of said cage receptacle. A ventilation air supply system that provides air to the entire cage receptacle and allows the air to leave the cage receptacle in the same manner without the need for a filter cap or bonnet. The ventilation system creates an even flow of air along the side of the cage receptacle thus providing an even air flow across the bottom of the cage, and therefore providing a better environment for the animal. The present invention also provides a an animal cage with biological barrier means integral to said cage receptacle for precipitating microparticles and/or contaminants in the supply air out of suspension due to the low velocity of the supply air during static ventilation.

44 Claims, 6 Drawing Sheets

FLEX-AIR VENTILATED RACK SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to a ventilated cage system, and in particular, to a ventilation air supply system that provides air to the entire cage receptacle and allows the air to leave the cage receptacle in the same manner without the need for a filter cap or bonnet. The cage receptacle lid comprises a permanently mounted seal to prevent cross-contamination with the room air and cage air. The improved ventilation system creates an even flow of air along the side of the cage receptacle thus providing an even air flow across the bottom of cage, and therefore providing a better environment for an animal.

2. Brief Description of the Related Art

Ventilated cage systems are well known in the art. Cages within the ventilated system traditionally are connected to a High Efficiency Particulate Air (HEPA) filtered air system for the protection of both the research animals and the laboratory personnel. The ventilated cage reduces heat, ammonia, and carbon dioxide concentrations in comparison to a static or non-ventilated cage. However, cages in a ventilated system must have the capability to be removed from the rack for feeding, cleaning and access to the animals. In addition, the cage must have the capability to maintain some type of air flow into the cage when removed from the ventilation system.

Information relevant to attempts to address the problems of providing a well-ventilated cage system that maintains sterility both when connected to the ventilation and during static periods can be found in the following U.S. patents. These references mentioned in this background section are not admitted to be prior art with respect to the present invention.

Filter caps or bonnets used with ventilated cage systems are well known in the art. During static ventilation, filter caps or bonnets are means to provide an air supply to the animal and yet minimize cross-contamination between cages and the external environment. Examples of filter bonnet cages may be found in U.S. Pat. Nos. 4,593,650; 5,000,120; and 6,158,387. Cages with filter caps or bonnets suffer from one or more of the following disadvantages. If the filter cap or bonnet does not encompass a protective plate, the filter is exposed such that an animal might damage the filter, rendering it ineffective and resulting in contamination. In addition, the filter must be regularly changed or replaced.

U.S. Pat. No. 4,480,587 to Sedlacek, which is incorporated herein by reference, discloses a cage containing a filter cap that has a substantially rigid transparent housing that rests on and encompasses the cage. A portion of the filter cap overhangs a portion of the cage to prevent the filter cap from being dislodged from the cage. An air filter is detachably secured to the roof portion of the filter cap and is protected from damages by a perforated steel plate.

However, personnel changing the filter are required to use tools to remove the protective plate to release the filter. The use of the tools requires additional resources and time. In addition, during the changing of the filter, the animal within the cage could escape through the open top.

In order to create a clean air system during non-static conditions, the prior art has utilized HEPA filtered air delivered into the cage. HEPA filtered air systems aid in the removal of heat, humidity, and unwanted micro-environmental vapors while the cage is on the rack. U.S. Pat. No. 5,000,120 to Coiro, Sr. et al., which is incorporated herein by reference, discloses a rack and cage combination that includes a forced air ventilation system that is automatically coupled to the cage when it is placed for storage on the rack. Coiro et al., also discloses that the filtered HEPA is directed downwardly with moderate velocity by the air supply tube. As such there will be a positive pressure in the cage that will result in air being exhausted from the cage primarily via the openings. The forced air system includes means for directing air down onto the floor of the cage whereby vapors that normally settle at the bottom of the cage are circulated vertically toward the bonnet filter. Coiro et al., also discloses ventilation passages around the periphery of the open top under the skirt of the filter bonnet so that gases, vapors, and particulate matter to freely pass out of the cage.

U.S. Pat. No. 5,148,766 to Coiro, Sr. et al., which is incorporated herein by reference, discloses an animal rack and cage system in which forced HEPA filtered air is introduced into the bonnet of each cage and removed from the periphery of the bonnet. A positive air probe is connected to a HEPA filter supply inlet manifold and is introduced into each cage through an aperture in the bonnet. Each ventilating probe includes a port that faces downwardly towards the bottom section of each cage. The air probe includes a port that faces downward towards the bottom of the cage. An L-shaped spacer separates the bonnet from the bottom section so that air exhaust ports in the U-shaped guide can remove exhausted air from the periphery of the cage.

U.S. Pat. No. 5,954,013 to Gabriel et al., which is incorporated herein by reference, discloses a ventilation cage and rack system, which maximizes cage density. Gabriel et al., discloses that the rack includes at least one air exhaust plenum, and at least one canopy disposed within said rack. The canopy is capable of supporting a first cage within the rack above the canopy, and also positioning a second cage below the canopy so as to maintain a gap between the top of the second cage and the canopy to permit air to be drawn into the air exhaust plenum from the interior of the second cage through the top of the second cage and to also permit ambient air to be drawn across the top of the second cage into the air exhaust plenum.

Each of these references suffers from the disadvantage of requiring a filter cap or bonnet as a means to minimize contaminates from passing into or out of the cage. Because filter caps or bonnets inhibit air movement, larger fans or blowers are required to move the HEPA filtered air throughout the ventilation system. Increased blower or fan sizes often produce excess noise either by mechanical or high frequency fluid noise. This excess noise in a holding facility can be harmful to the animals. Also, at least two fans, one for delivery and one for exhaust, are required to move the air throughout the ventilation system.

Likewise, allowing contaminates to freely pass out of the cage into the animal holding facility may also create a harmful environment for the animals. In addition, several references force the air directly into the cage at or near the water valve, which may be disruptive to the animal as it drinks. The limitations of the prior art are overcome by the present invention as described below.

BRIEF SUMMARY OF THE INVENTION

The present invention is directed to an apparatus that satisfies the needs identified above. The invention comprises a ventilated cage receptacle encompassing a ventilation distribution chamber that can function during static or active ventilation. By altering the way the air is directed into the cage, a more even flow of air along the length of the cage is achieved. This present invention also minimizes the number of fans required. The invention utilizes a single fan to create a positive or negative pressure for air movement during active ventilation.

The cage receptacle comprises an integral ventilation distribution chamber that during forced or non-static ventilation distributes air to the entire cage receptacle and allows the air to leave the receptacle in the same manner. The ventilation air is distributed to one side of the cage receptacle wherein the air passes into a distribution chamber. The distribution chamber functions to maintain an even flow of air along the length of the cage and subsequently down to the floor of the cage. One embodiment of the invention is to change the area of the distribution chamber by a gradual taper along its length. The tapering of the distribution chamber creates a flow of supply air along the long side of the cage receptacle. The air passes into the distribution chamber containing small perforations. Gradually tapering the distribution chamber and maintaining a constant perforation size diverts the flow of air down the interior side wall of the cage receptacle. The air subsequently travels along the floor of the receptacle toward the opposite interior side wall of the cage. The air exits the cage receptacle by an integral distribution chamber on the opposite side of the cage. Because the exit distribution chamber has less internal pressure than the supply distribution chamber, the air freely moves into the exit distribution chamber. Air travels along the exit distribution chamber, into the integral biological barrier and subsequently out of the cage.

Another embodiment of the distribution chamber is to maintain a uniform cross sectional area of the distribution chamber along the length of the cage, but alter the size and/or frequency of the perforations along the length of the cage. By increasing the size of the perforations in the distribution chamber along its length, a more even flow of positive pressure air is achieved.

The invention also comprises an integral biological barrier that functions during static ventilation to significantly reduce contaminants entering the cage receptacle without the need for a filter cap or bonnet. The integral biological barrier is a chamber located inside the cage receptacle wherein the slow moving air must ascend vertically before entering the main housing area. During static ventilation the velocity of the air is not sufficient to lift the contaminants up the vertical ascent. Contaminants fall out of suspension as the air continues into the distribution chamber and subsequently the main housing area of the receptacle.

The distribution cover acts as the top cover of the distribution chamber. The distribution cover works both by diverting air down the cage receptacle. The invention further employs a unique process of permanently embedding a seal into the cage lid, thus creating a one-piece lid and seal. The seal embedded lid prevents cross contamination of room air and cage air. When the cage receptacle is placed into the ventilation rack system, a pressure means exert downward on the lid compressing the seal, thus preventing air from moving in or out around the rim of the cage lid. A benefit of the one-piece cage lid and seal is that the user will not have to clean and reinstall the seal every time the cage receptacle is cleaned or maintenanced.

It is therefore an object of the present invention to provide for a ventilation cage system that evenly distributes supply air along the length of the entire cage receptacle and allows the air to leave the receptacle in the same manner using a ventilation distribution chamber.

It is a further object of the present invention to provide for an integral biological barrier for static ventilation without the need for a filter cap or bonnet.

It is also an object of the present invention to provide an integrated cage seal to alleviate the need for the user to maintain and clean both the seal and cage lid.

It is still further an object of the present invention to provide an integrated seal within the cage lid to prevent cross contamination of room air and cage air.

These and other features, objects and advantages of the present invention will become better understood from a consideration of the following detailed description of the preferred embodiments and appended claims in conjunction with the drawings as described following:

DETAILED DESCRIPTION OF THE INVENTION

With reference to FIGS. 1–6, the preferred embodiment of the present invention may be described. The present invention is a ventilated cage and rack system, and in particular, a ventilation air supply system that provides air to the entire cage receptacle and allows the air to leave the cage receptacle in the same manner without the need for a filter cap or bonnet. The ventilation system creates an even flow of air along the length of the side of the cage receptacle thus providing less internal pressure in the cage, and therefore providing a better environment for the animal.

Figure 1:
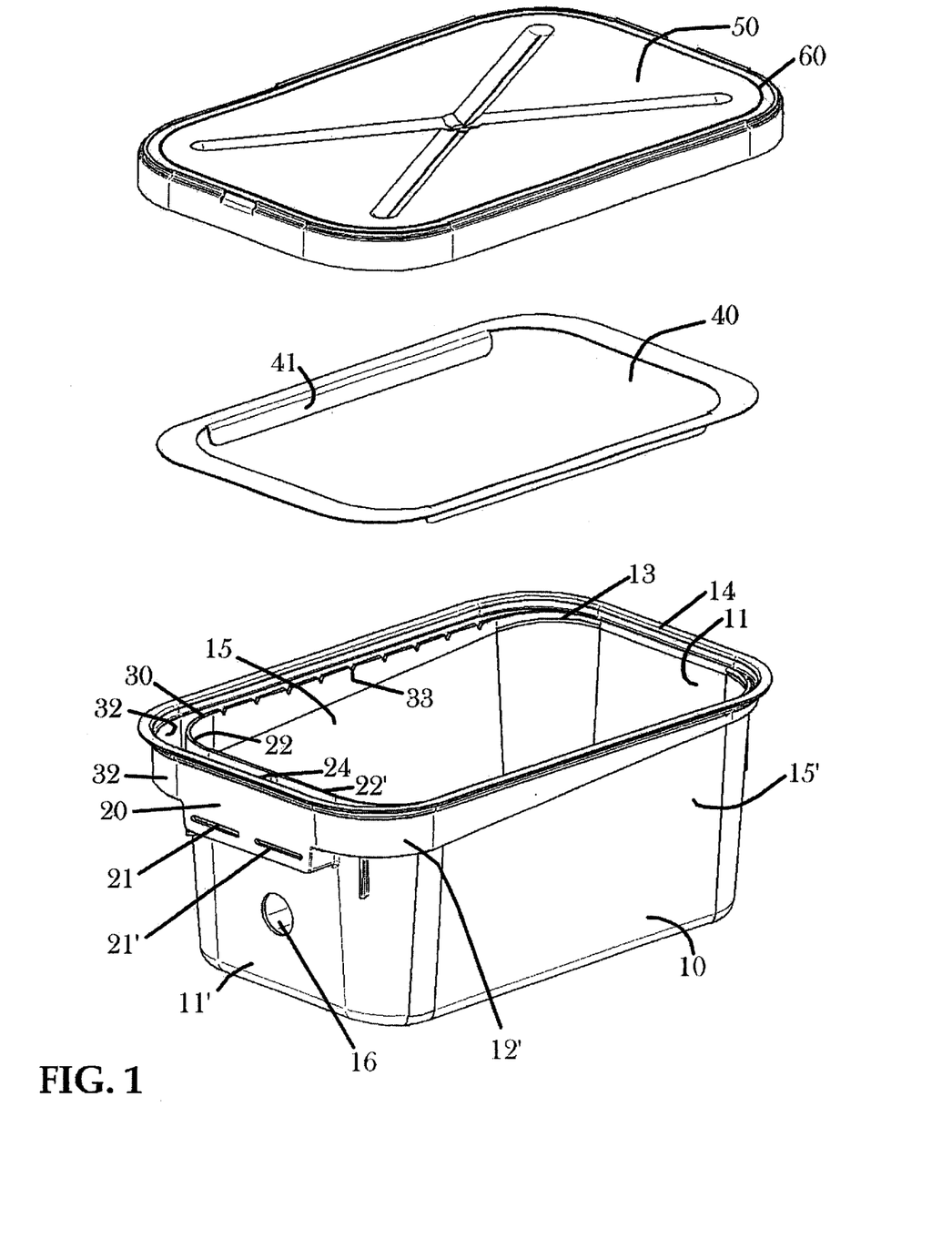
FIG. 1 is an exploded perspective view of the present invention wherein the device is provided with a distribution cover and lid.

FIG. 1 is an exploded view of one embodiment of the cage receptacle 10 of the present invention. The cage receptacle 10 comprises an integral biological barrier 20 and an integral ventilation distribution chamber 30 that evenly distributes the supply ventilation air to the entire cage receptacle 10 and allows the air to leave the cage receptacle 10 in the same manner. When the cage receptacle 10 is connected to a HEPA filtered air system, the positive or negative pressure HEPA filtered air is delivered to the cage receptacle 10 through an entry port 21 in the integral biological barrier 20. The integral biological barrier 20 embodies at least one separator 24, and internal chamber walls 22, 22'. The separator 24 prevents supply air entering through the entry port 21 to be co-mingled with outgoing cage air through the exit port 21'. The internal chamber walls 22, 22' connect the internal walls 34 and 34' of the integral ventilation distribution chamber 30.

While the embodiments of FIGS. 1, 4, 5, and 6 disclose ports 21, 21' as small, narrow rectangles, various shapes of the ports are contemplated as being within the scope of the present invention and the particular embodiment shown is not intended to limit the invention to only this embodiment. Similarly, in the embodiments of FIGS. 1, 4, 5, and 6, ports 21, 21' are shown as the entry and exit ports respectively, however the scope of the present invention contemplates either port could be used as the entry and exit ports for air.

As shown in FIGS. 1, 4, 5, and 6, air entering the entry port 21 in the integral biological barrier 20, then enters the vertical ascent chamber 23 and subsequently vertically ascends before entering the integral ventilation distribution chamber 30. When the cage receptacle 10 is used with positive pressure HEPA filtered air, the velocity of the positive pressure HEPA filtered air is moved directly from the entry port 21 into integral biological barrier 20 and subsequently to the integral ventilation distribution chamber 30.

During static ventilation, the low velocity air must also vertically ascend in vertical ascent chamber 23 before entering the ventilation distribution chamber 30. During static ventilation, the velocity of air is not sufficient to transport microparticles or contaminants into the integral ventilation distribution chamber 30, thus microparticles and/or contaminants precipitate out of suspension. Microparticles or contaminants subsequently fall to the floor 25 of the integral biological barrier 20 and do not enter the ventilation distribution chamber 30 or the cage receptacle 10. Microparticles or contaminants can easily be removed from the floor 25 of the integral biological barrier 20 during routine washing and sterilization of the cage receptacle 10.

Upon vertically ascending from the vertical ascent chamber 23 the air, either HEPA filtered ventilation or static air passes into the integral ventilation distribution chamber 30. In one embodiment, the integral ventilation distribution chamber 30 gradually decreases in depth and width until the integral ventilation distribution chamber 30 merges into the end wall 11 and rim 14 of the cage receptacle 10.

While the embodiments of FIGS. 1–4 disclose an embodiment of the distribution chamber 30 in which the depth and width gradually decrease long the length of the cage, any geometry which achieves a altered cross sectional area along the length of the distribution chamber 30 is contemplated as being within the scope of the present invention and the particular embodiment shown is not intended to limit the invention to only this embodiment.

Figure 2:
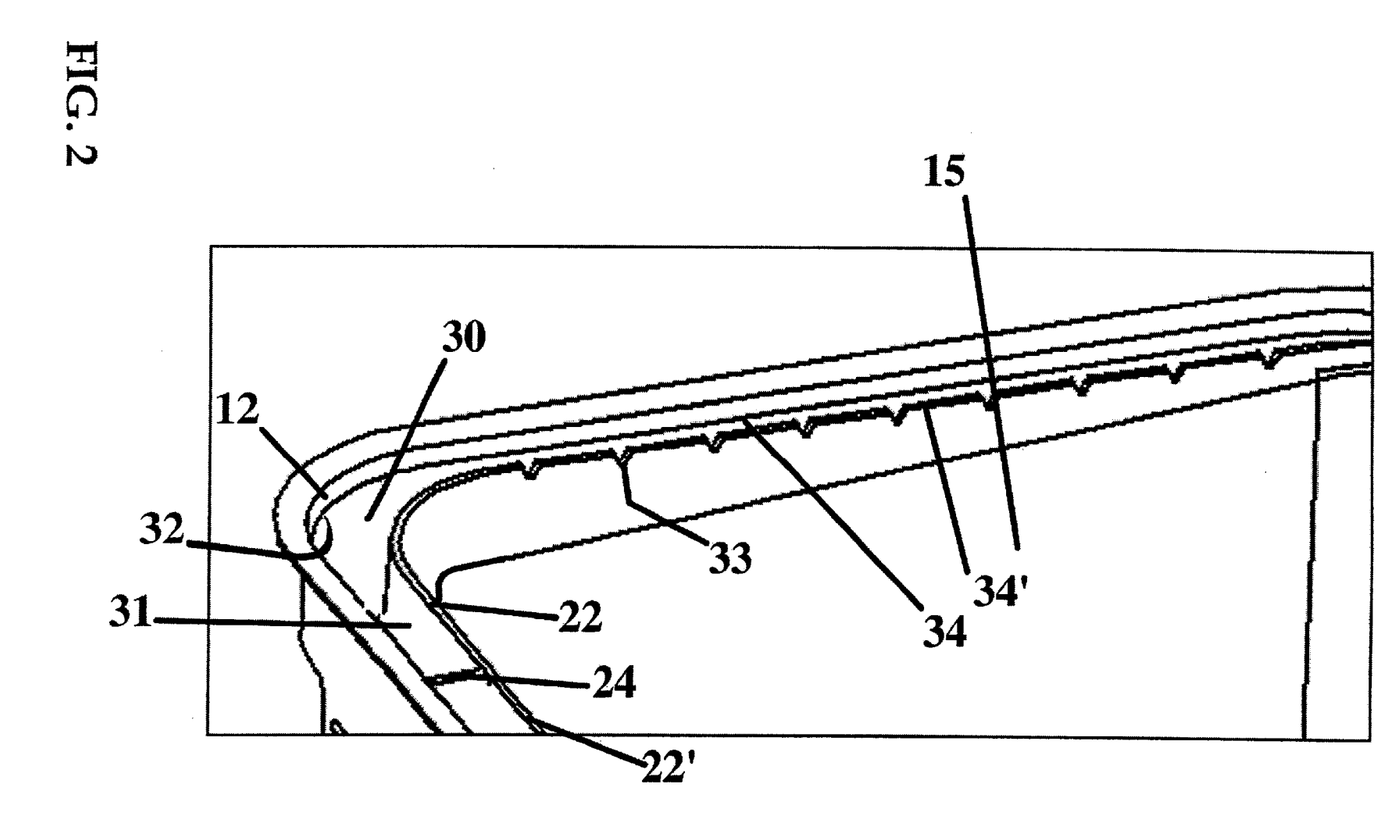
FIG. 2 is a close-up view of the integral ventilation distribution chamber of the present invention.
Figure 3:
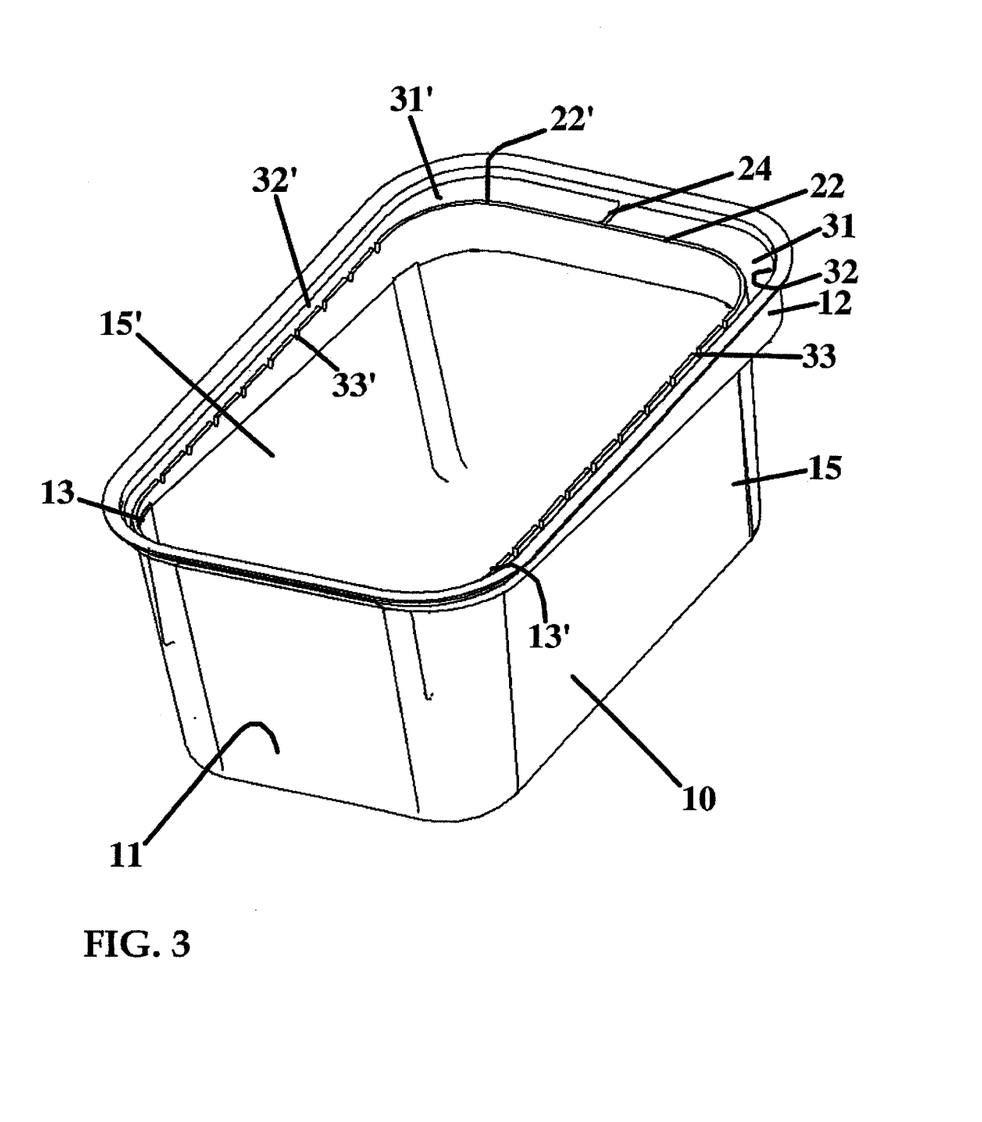
FIG. 3 is a top end view showing the distribution chamber.
Figure 4:
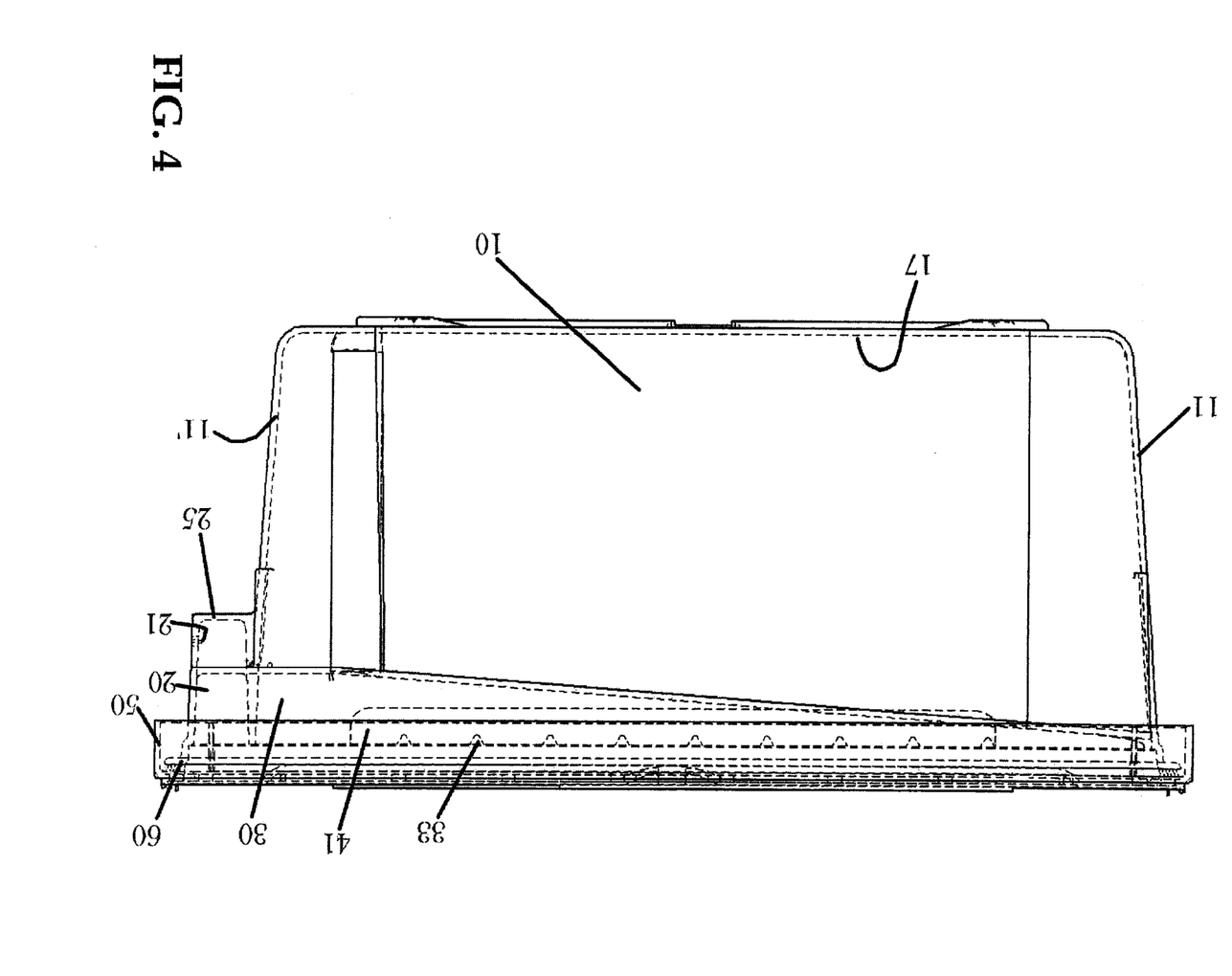
FIG. 4 is a side elevation cross-sectional view showing the cage receptacle.
Figure 5:
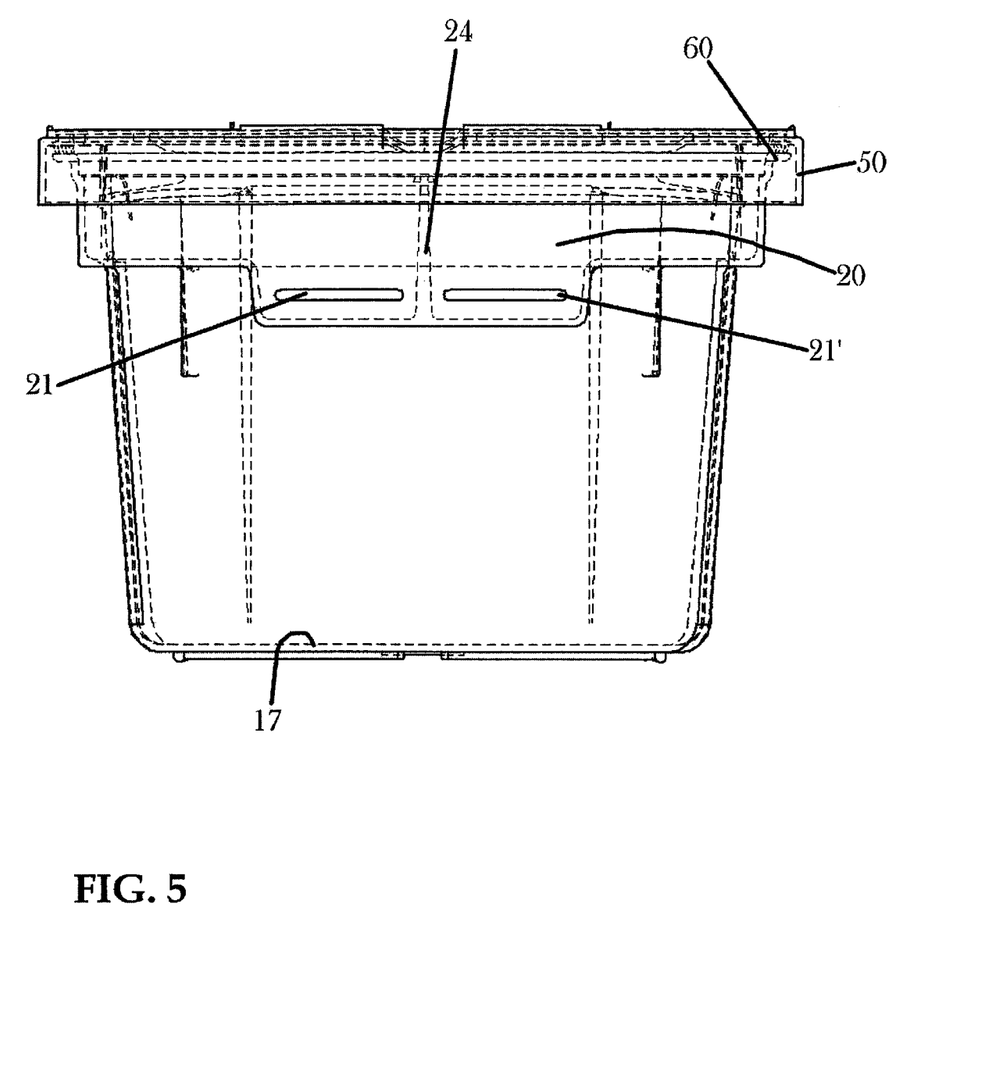
FIG. 5 is an end elevation cross-sectional view showing the cage receptacle.

FIGS. 2 and 3 demonstrate that the width 31 of the integral ventilation distribution chamber 30 and the integral biological barrier 20 is constant until the integral ventilation distribution chamber 30 extends into curved sections 32 around the corners 12, 12' of the cage receptacle 10. The width 31 of the integral ventilation distribution chamber 30 gradually tapers around corners 13, 13' of the cage receptacle 10. The sidewall width 32 of the integral ventilation distribution chamber 30 is constant until the integral ventilation distribution chamber 30 merges at the end wall 11 and rim 14 of the cage receptacle 10.

The integral ventilation distribution chamber 30 contains a plurality of small perforations 33 along the sidewall 34 of the integral ventilation distribution chamber 30. The small perforations 33 allow air to pass through. While the embodiments of FIGS. 1, 2, 3, and 4 disclose small perforations 33 along the side wall 34 of the integral ventilation distribution chamber 30, various shapes and sizes of perforations 33 are contemplated as being within the scope of the present invention and the particular embodiment shown is not intended to limit the invention to only this embodiment.

Air entering the integral ventilation distribution chamber 30 passes through the small perforations 33. The decreasing width and depth of the integral ventilation distribution chamber 30 helps maintain the same air pressure throughout the length of the integral ventilation distribution chamber 30 as the air is exiting from each perforation 33. The evenly pressured integral ventilation distribution chamber 30 with perforations 33 along its length creates an even flow of supply air along the side 15 of the cage receptacle 10.

As previously discussed, another embodiment of the distribution chamber 30 is one wherein the distribution chamber 30 is maintained at a constant cross sectional area and only the number and diameter of the perforations 33 are altered. By uniformly increasing the diameter and/or the frequency of the perforations 33 along the length of the distribution chamber 30, an even flow of supply air along the side 15 of the cage receptacle 10 can be achieved.

The even flow of air is diverted down the side 15 of the cage receptacle 10 by the diverter 41 attached to the distribution cover 40. The removable stainless steel distribution cover 40 nests within the upper edges of the cage receptacle 10.

Figure 6:
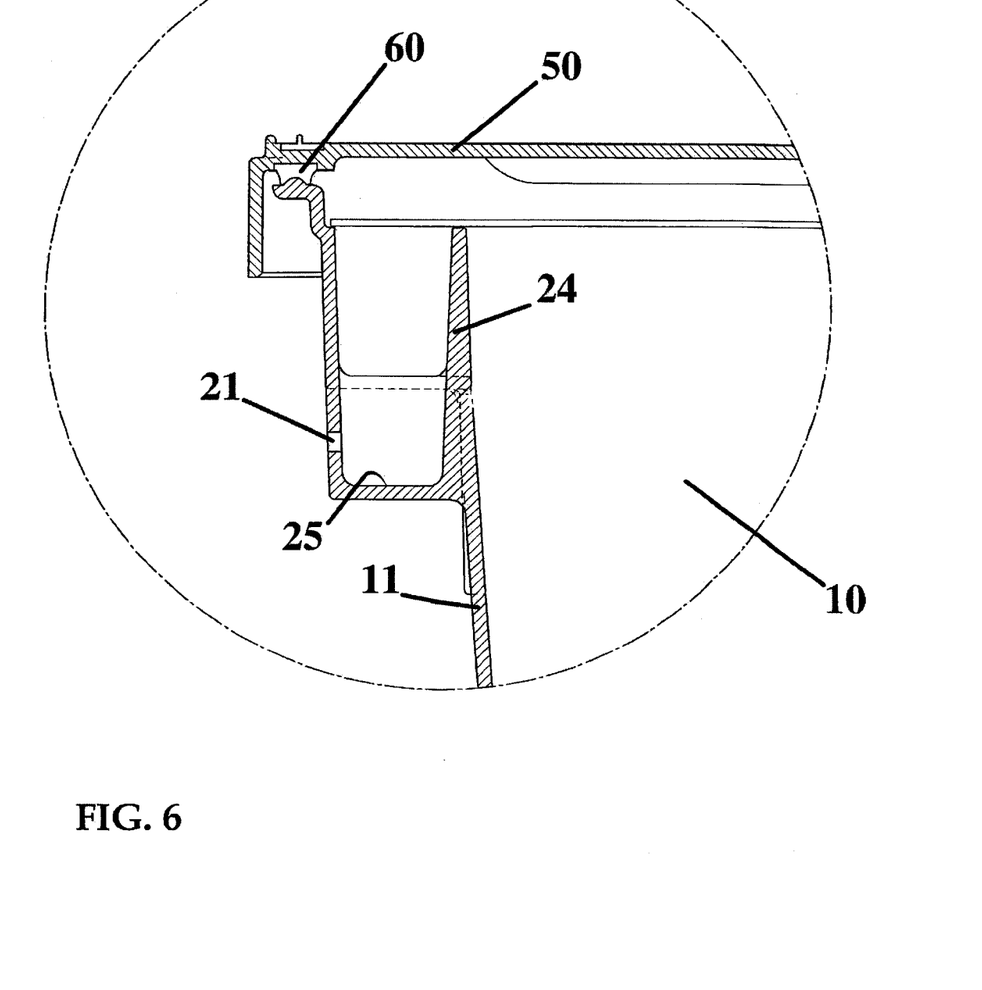
FIG. 6 is a close-up cross-sectional view of the lid placed on the cage receptacle.

FIG. 6 shows the cage receptacle lid 50 is supported on the cage receptacle 10 and has downwardly turned edge portions that fit over the rim 14 of the cage receptacle 10. The cage receptacle lid 50 encompasses an integrated permanently mounted seal 60. The integrated seal 60 of the cage receptacle lid 50 serves as a barrier to the ingress or egress of air and contaminants.

Once diverted down the side 15 of the cage receptacle 10, the flow of air forms an even curtain of supply air down to the floor 17 of cage receptacle 10. The air then travels across the floor 17 of the cage receptacle 10 to the opposing inside wall 15' of the cage receptacle 10. The flow of air exits through a plurality of small perforations 33' along the sidewall 34' of the integral ventilation distribution chamber 30' on the opposing inside wall 15' of the cage receptacle 10. The flow of air travels along the integral ventilation distribution chamber 30' and exits through port 21' of the integral biological barrier 20. The return ventilation distribution chamber 30' has less internal pressure than the supply ventilation distribution chamber 30, which permits the air to flow into the integral biological barrier 20 and leave the cage receptacle 10 via a port 21'.

Water may be supplied to the cage receptacle 10 by a water supply system that is connected to the cage receptacle 10 via an opening 16. Alternatively, water and food may be supplied internally through attachment of a wire bar rack to the distribution cover 40.

The present invention has been described with reference to certain preferred and alternative embodiments that are intended to be exemplary only and not limiting to the full scope of the present invention as set forth in the appended claims.

What is claimed is:

1. An animal cage adapted for providing supply air to the cage by either static or forced ventilation, comprising:
   a cage receptacle;
   ventilation distribution chamber integral to said cage receptacle for distributing supply air uniformly along the length of an interior space of said cage receptacle.

2. The cage of claim 1 wherein said ventilation distribution chamber comprises at least one internal side wall.

3. The cage of claim 2 wherein said internal side wall comprises a plurality of perforations communicating with said interior space of said cage receptacle.

4. The cage of claim 2 wherein said ventilation distribution chamber is disposed along a side of said cage receptacle and said ventilation distribution chamber is further characterized by a depth which gradually decreases along said side of said cage receptacle.

5. The cage of claim 1 further comprising a distribution cover wherein said distribution cover comprises diverter means for diverting supply air from said ventilation distribution chamber downwardly along said side of said cage receptacle.

6. The cage of claim 1 wherein said cage receptacle further comprises a rim and said cage further comprises a lid having a seal conforming to said rim.

7. The cage of claim 6 wherein said seal is permanently integrated into said lid.

8. The cage of claim 7 wherein said lid is formed of transparent plastic material.

9. The cage of claim 6 wherein said lid further comprises an air filter.

10. An animal cage adapted for providing supply air to the cage by either static or forced ventilation, comprising:
   a cage receptacle;
   biological barrier means integral to said cage receptacle for precipitating microparticles and/or contaminants in the supply air out of suspension due to the low velocity of the supply air during static ventilation; and
   ventilation distribution chamber integral to said cage receptacle for distributing supply air uniformly along the length of an interior space of said cage receptacle.

11. The cage of claim 10 wherein said ventilation distribution chamber comprises at least one internal side wall.

12. The cage of claim 11 wherein said internal side wall comprises a plurality of perforations communicating with said interior space of said cage receptacle.

13. The cage of claim 11 wherein said ventilation distribution chamber is disposed along a side of said cage receptacle and said ventilation distribution chamber is further characterized by a depth which gradually decreases along said side of said cage receptacle.

14. The cage of claim 10 further comprising a distribution cover wherein said distribution cover comprises diverter means for diverting supply air from said ventilation distribution chamber downwardly along said side of said cage receptacle.

15. The cage of claim 10 wherein said biological barrier means comprises at least one vertical ascent chamber.

16. The cage of claim 10 wherein said biological barrier means comprises at least one air input means for passing supply air into said biological barrier means.

17. The cage of claim 16 wherein said biological barrier means comprises at least one air output means for passing stale air out of said biological barrier means.

18. The cage of claim 17 wherein said biological barrier means comprises at least one separator means for preventing commingling of supply air and stale air.

19. The cage of claim 10 wherein said cage receptacle further comprises a rim and said cage further comprises a lid having a seal conforming to said rim.

20. The cage of claim 19 wherein said seal is permanently integrated into said lid.

21. The cage of claim 20 wherein said lid is formed of transparent plastic material.

22. The cage of claim 19 wherein said lid further comprises an air filter.

23. An animal cage system for providing supply air to an animal cage by either static or forced ventilation, comprising:
   an animal cage;
   rack means for supporting said animal cage;
   said animal cage further comprising
      a cage receptacle; and
      ventilation distribution chamber integral to said cage receptacle for distributing supply air uniformly along the length of an interior space of said cage receptacle.

24. The animal cage system of claim 23 wherein said ventilation distribution chamber comprises at least one internal side wall.

25. The animal cage system of claim 24 further comprising a distribution cover wherein said distribution cover comprises diverter means for diverting supply air from said ventilation distribution chamber downwardly along said side of said cage receptacle.

26. The animal cage system of claim 24 wherein said internal side wall comprises a plurality of perforations communicating with said interior space of said cage receptacle.

27. The animal cage system of claim 24 wherein said ventilation distribution chamber is disposed along a side of said cage receptacle and said ventilation distribution chamber is further characterized by a depth which gradually decreases along said side of said cage receptacle.

28. The animal cage system of claim 23 wherein said cage receptacle further comprises a rim and said cage further comprises a lid having a seal conforming to said rim.

29. The animal cage system of claim 28 wherein said seal is permanently integrated into said lid.

30. The animal cage system of claim 29 wherein said lid is formed of transparent plastic material.

31. The animal cage system of claim 28 wherein said lid further comprises an air filter.

32. An animal cage system for providing supply air to an animal cage by either static or forced ventilation, comprising:
   an animal cage;
   rack means for supporting said animal cage;
   said animal cage further comprising
      a cage receptacle;
      biological barrier means integral to said cage receptacle for precipitating microparticles and/or contaminants in the supply air out of suspension due to the low velocity of the supply air during static ventilation; and
      ventilation distribution means)integral to said cage receptacle for distributing supply air uniformly along the length of an interior space of said cage receptacle.

33. The animal cage system of claim 32 wherein said ventilation distribution chamber comprises at least one internal side wall.

34. The animal cage system of claim 33 wherein said internal side wall comprises a plurality of perforations communicating with said interior space of said cage receptacle.

35. The animal cage system of claim 33 wherein said ventilation distribution chamber is disposed along a side of said cage receptacle and said ventilation distribution chamber is further characterized by a depth which gradually decreases along said side of said cage receptacle.

36. The animal cage system of claim 32 further comprising a distribution cover wherein said distribution cover comprises diverter means for diverting supply air from said ventilation distribution chamber downwardly along said side of said cage receptacle.

37. The animal cage system of claim 32 wherein said biological barrier means comprises at least one vertical ascent chamber.

38. The animal cage system of claim 32 wherein said biological barrier means comprises at least one air input means for passing supply air into said biological barrier means.

39. The cage of claim 38 wherein said biological barrier means comprises at least one air output means for passing stale air out of said biological barrier means.

40. The animal cage system of claim 39 wherein said biological barrier means comprises at least one separator means for preventing commingling of supply air and stale air.

41. The animal cage system of claim 32 wherein said cage receptacle further comprises a rim and said cage further comprises a lid having a seal conforming to said rim.

42. The animal cage system of claim 41 wherein said seal is permanently integrated into said lid.

43. The animal cage system of claim 42 wherein said lid is formed of transparent plastic material.

44. The animal cage system of claim 41 wherein said lid further comprises an air filter.

* * * * *

UNITED STATES PATENT AND TRADEMARK OFFICE
CERTIFICATE OF CORRECTION

PATENT NO.    : 6,612,260 B1                                    Page 1 of 1
DATED         : September 2, 2003
INVENTOR(S)   : Loyd, E. et al.

It is certified that error appears in the above-identified patent and that said Letters Patent is hereby corrected as shown below:

Title page,
Item [75], Inventors, delete "AK" and substitute therefore -- AR -- (both occurrences).
Item [73], Assignee, delete "AK" and substitute therefore -- AR --.

Signed and Sealed this

Sixth Day of January, 2004

JAMES E. ROGAN
*Director of the United States Patent and Trademark Office*